Oct. 29, 1963    E. SCHARRER ETAL    3,108,906
ELECTRIC DISCHARGE TUBE
Filed May 22, 1959
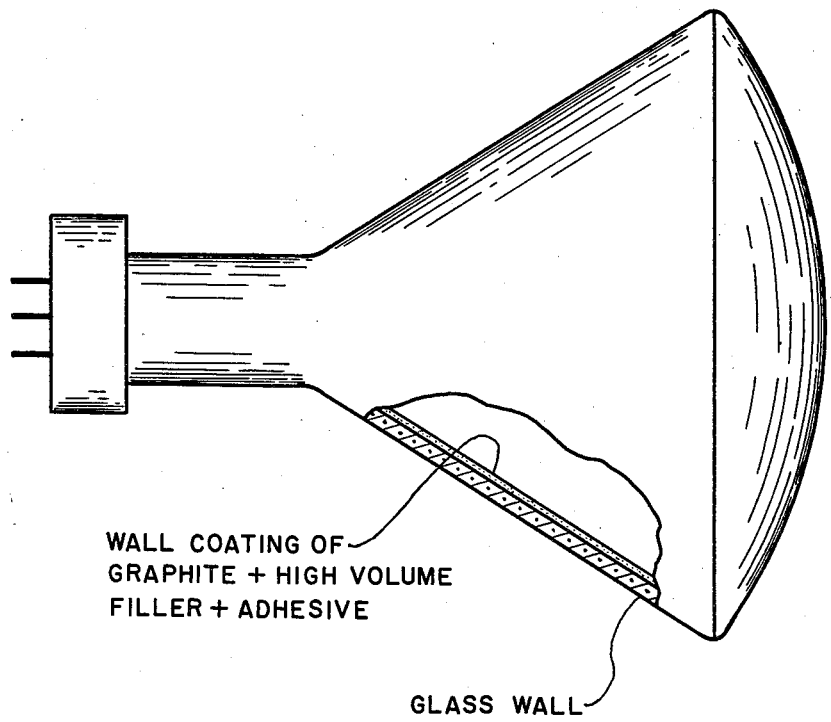
WALL COATING OF
GRAPHITE + HIGH VOLUME
FILLER + ADHESIVE
GLASS WALL
INVENTORS
E. SCHARRER
G. KOSSOW
BY
AGENT

United States Patent Office 3,108,906
Patented Oct. 29, 1963

3,108,906
ELECTRIC DISCHARGE TUBE
Erich Scharrer, Oberforstbach uber Aachen, and Gunther Kossow, Aachen, Germany, assignors to North American Philips Company Inc., New York, N.Y., a corporation of Delaware
Filed May 22, 1959, Ser. No. 815,084
Claims priority, application Germany May 24, 1958
4 Claims. (Cl. 117—226)

This invention relates to electric discharge tubes, in particular cathode-ray tubes, provided with conductive wall coatings containing graphite. Such conductive coatings are applied to the glass envelope wall of the discharge tube and serve, for example, to establish conductive connections, for example between the anode contact and other parts of the electrode system. The invention also relates to a method of manufacturing a graphite suspension to be used for such coatings.

In the known suspensions the graphite is mixed only with deionized water or with a water-soluble organic protective colloid. It is also known to mix the graphite with polyvinyl alcohol to produce a spreadable suspension.

These known suspensions have a limitation in that, owing to the lamellar structure of the graphite, there is considerable shrinkage and the adherence to the envelope wall and to the electrodes is slight. As a result, the coating may become detached from the wall and the anode contact or other metallic component part. The detached particles may fall on parts of the electrode system and, by secondary emission, produce scattered radiation, which interferes with the operation of the tube.

An electric discharge tube in accordance with the invention is provided as shown in the FIGURE with a graphite-containing conductive wall coating, which is characterized in that it contains a filler of a voluminous crystal structure and an adhesive forming a structure of high molecular weight.

Suitable fillers are, for example, $Al_2O_3$, $MgO$, $TiO_2$ and $ZnO$.

Zinc oxide is particularly advantageous since it has the highest conductivity of all the suitable fillers having a voluminous crystal structure. However, the conductivity of zinc oxide still is about 100 times as small as that of graphite. In order to avoid an excessive reduction of the conductivity, only a comparatively small amount of zinc oxide should be added. A zinc oxide shaped in the form of stars, which form is readily recognizable in an electron microscope, proved particularly suitable.

The cohesion of the constituents of the wall coating and the adhesion to the tube wall or to a metal base layer, for example the anode contact, are increased with the aid of silicates, for example potassium silicate. The adherence depends substantially upon the property of the silicate to form a structure of high molecular weight by wetting the separate constituents of the wall coating. Phosphates and borates have similar suitable adhesive properties.

The simultaneous use of zinc oxide and a silicate results in the particularly favourable formation of zinc silicates so that a highly satisfactory adherence of the wall coating and of the constituents to one another is ensured.

In order to improve the spreadability and the stability, there may further be added to the aqueous suspension which is prepared for the application of the wall coating, slight amounts of dextrin or related water-soluble organic protective colloids.

The grain size of the graphite used influences the thixotropy of the suspension. Preferably, graphite particles are used which have a diameter of from 10 microns to 30 microns.

Graphite suspensions in accordance with the invention for applying a coating to the inner wall of a discharge tube may have the following compositions:

*Graphite Suspension I*

250 gms. of graphite
25 gms. of zinc oxide
350 gms. of potassium silicate, specific gravity=1.2
2.5 gms. of dextrin
372.5 gms. of deionized water.

1000.0 gms.

*Graphite Suspension II*

232 gms. of graphite
35 gms. of zinc oxide
490 gms. of potassium silicate, specific gravity=1.2
243 gms. of deionized water.

1000.0 gms.

The suspensions are produced by grinding the constituents together in a ball mill for from 20 to 30 hours, for example 24 hours. Subsequently, the ground product is diluted with deionized water until the suspension is brushable.

What is claimed is:

1. An electrical device comprising an envelope having wall portions and on a wall portion an adherent conductive coating comprising a mixture of graphite particles, an adhesive, and a filler material of ZnO, thereby forming a coating of high molecular weight and good adherence.

2. A device as set forth in claim 1 wherein the adhesive is a material selected from the group consisting of silicates, phosphates and borates.

3. An electrical device comprising an envelope having glass wall portions and on a glass wall portion an adherent conductive coating comprising a mixture of essentially graphite particles having a diameter of from 10 to 30 microns, an adhesive, and a filler material of ZnO, thereby forming a coating of high molecular weight and good adherence.

4. An electrical device comprising an envelope having glass wall portions and on a glass wall portion an adherent conductive coating comprising a mixture of essentially graphite particles having a diameter of from 10 to 30 microns, a silicate adhesive, and a small amount of ZnO, thereby forming a coating of high molecular weight and good adherence.

References Cited in the file of this patent

UNITED STATES PATENTS

| | | |
|---|---|---|
| 2,151,992 | Schwartz | Mar. 28, 1939 |
| 2,162,391 | Schwartz et al. | June 13, 1939 |
| 2,177,705 | Friederich | Oct. 31, 1939 |
| 2,196,128 | Stuart | Apr. 2, 1940 |
| 2,264,858 | Record | Dec. 2, 1941 |
| 2,409,514 | Pratt | Oct. 15, 1946 |
| 2,699,510 | Smelt | Jan. 11, 1955 |
| 2,740,062 | Swedlund | Mar. 27, 1956 |

FOREIGN PATENTS

| | | |
|---|---|---|
| 735,463 | Great Britain | Aug. 24, 1955 |